(12) United States Patent
Liburdi

(10) Patent No.: US 7,367,719 B1
(45) Date of Patent: May 6, 2008

(54) EMI SHIELD FOR OPTICAL CONNECTOR

(76) Inventor: Francesco Liburdi, 2653 Alexander St., Endicott, NY (US) 13760

(*) Notice: Subject to any disclaimer, the term of this patent is extended or adjusted under 35 U.S.C. 154(b) by 140 days.

(21) Appl. No.: 11/299,404

(22) Filed: Dec. 12, 2005

(51) Int. Cl.
*G02B 6/36* (2006.01)
(52) U.S. Cl. .......................................... 385/92; 385/89
(58) Field of Classification Search ............ 385/88–94
See application file for complete search history.

(56) References Cited

U.S. PATENT DOCUMENTS

| | | |
|---|---|---|
| 5,117,476 A | 5/1992 | Yingst et al. |
| 6,540,412 B2 | 4/2003 | Yonemura et al. |
| 6,783,283 B2 | 8/2004 | Nishita |
| 6,840,686 B2 | 1/2005 | Jiang et al. |
| 2005/0036747 A1* | 2/2005 | Togami et al. ................. 385/92 |

* cited by examiner

*Primary Examiner*—Frank G. Font
*Assistant Examiner*—Michael P. Mooney
(74) *Attorney, Agent, or Firm*—Mark Levy; Hinman, Howard & Kattell

(57) ABSTRACT

An electromagnetic interference (EMI) shield for an optical connector. The EMI shield has a socket housing with a base and a canopy. The socket housing also has a front and a rear opening. The EMI shield contains an optical transceiver that is placed near the rear opening of the socket housing and contains two components used for signal conversion from optical and electrical signals. The EMI shield further contains a rear housing that is placed near the rear opening of the socket housing for maintaining the optical transceiver in a predetermined position. The EMI shield also contains a rear shield that is at the rear opening of the socket housing and a front shield that includes two, independent, optical sub-housing shields.

22 Claims, 2 Drawing Sheets

EMI SHIELD FOR OPTICAL CONNECTOR

FIELD OF THE INVENTION

The present invention relates to optical connectors and, more specifically, to a duplex optical fiber connector accommodating both an input and output line, wherein the lines are isolated, light-confined, and protected from electromagnetic interference (EMI).

BACKGROUND OF THE INVENTION

The field of fiber optics is based on the fact that light can be used to transmit data or information. This information is sent through optical fibers, which are thin, cylindrical wires made of optical glass. Optical fibers offer many benefits compared with a metal cable wire for transmitting information. Compared with metal conduits, optical fibers are less expensive, light weight, and require low power. Optical fibers are also flexible and thinner, and thus have a higher information carrying capacity.

Optical connectors are an integral part of a fiber optic transmission system. The purpose of the connector is to ensure that an optical fiber is properly aligned with the emitter in a transmitter and/or the photo-detector in a receiver. The transmitter receives an electrical signal and transmits an optical signal. Correspondingly, the receiver detects an optical signal and generates a resulting electrical signal.

As aforementioned, transmission of optical and electrical signals occurs in an optical connector. The use of both signals necessitates an optical transceiver that receives optical signals and transmits information therein as electrical signals. The response of such electrical signals is then received at a spaced apart or a remote location by a receiver and subsequently transmitted as optical signals. The transformation of an optical signal to an electrical signal is a separate process from the transformation of an electrical signal to an optical signal. Certain devices have been developed for applications in which optical connectors require protection from EMI. EMI is an important factor to recognize in any electrical design because electromagnetic disturbances can cause failures in electrical equipment or distortions in signal transmissions. Minimizing EMI and any interference between the two processes is an objective of this invention.

A housing shield is an efficient method of protecting an optical connector from EMI. Unfortunately, housing shields are available only for a device with a single front shield. These designs aid in prevention of EMI disturbance; however, the single front shield device by itself also permits crosstalk between the two lines and additional EMI.

DISCUSSION OF THE RELATED ART

U.S. Pat. No. 5,117,476 for OPTICAL TRANSCEIVER PACKAGE WITH INSERTABLE SUBASSEMBLY, issued on May 26, 1992 to Stephen M. Yingst et al., discloses a transceiver package having a receptacle adapted to receive a connector terminating a cable having optical fibers; key elements of varied width to fit a corresponding groove of the connector respective ports for mating with the connector; and functional parts of a transceiver including: a transmitter active device and a receiver active device, integrated circuit substrate means and posts. The subassembly is contained in separate metallic shielding boxes.

U.S. Pat. No. 6,540,412 for OPTICAL TRANSCEIVER, issued on Apr. 1, 2003 to Ryugen Yonemura et al., discloses an optical transceiver comprising a receiver optical sub-module, a transmitter optical sub-module, and a housing to accommodate these modules. The receiver optical sub-module has a light receiving element, and a receiver electronic circuit substrate. The transmitter optical sub-module has a light emitting element, and a transmitter electronic circuit substrate. The housing has a receptacle part with which an optical connector is engaged. The receiver electronic circuit substrate and the transmitter electronic circuit substrate are disposed opposite each other. Optionally, a second opto-electrical conversion device can be included. A receptacle is shielded by a first shield, and the second opto-electric device is shielded by a second shield.

U.S. Pat. No. 6,783,283 for OPTICAL CONNECTOR FOR COUPLING OPTICAL SIGNALS TO OPTICAL DEVICES, issued on Aug. 31, 2004 to Naoki Nishita, discloses a connector capable of suppressing electrical crosstalk between optical devices, preferably performing optical coupling of the optical devices and electrical coupling by electric terminals. A first connector housing formed of a conductive resin accommodates a light receiving device. A second connector housing formed of a non-conductive resin accommodates a light emitting device and electric terminals. The first and second parts are arranged so that their positions are displaced in the longitudinal direction of the optical fibers, whereby the electrical crosstalk between the light receiving device and the light emitting device is suppressed.

U.S. Pat. No. 6,840,686, METHOD AND APPARATUS FOR VERTICAL BOARD CONSTRUCTION OF FIBER OPTICAL TRANSMITTERS, RECEIVERS AND TRANSCEIVERS, issued on Jan. 11, 2005 to Wenbin Jiang et al., discloses a fiber optic transmitter and receiver wherein electrical elements are implemented on separate vertical boards in fiber optic modules. The receiver and transmitter are mounted to receive and transmit vertical boards respectively. The boards nearly face each other but offset to avoid optical crosstalk. In a second embodiment, receiver and transmitter are mounted parallel with the print circuit boards. The vertical boards have ground planes to minimize electrical crosstalk. A shielded housing provides further shielding for EMI.

It would be advantageous to provide an EMI shield for an optical connector.

It would also be advantageous to provide an EMI shield completely surrounding an optical transceiver.

It would further be advantageous to provide an EMI shield have sub-housing EMI shields.

It would also be advantageous to provide a housing that efficiently confines light, as well as prevents EMI.

It would also be advantageous to provide an easily assembled EMI shield featuring a canopy.

SUMMARY OF THE INVENTION

In accordance with the present invention, there is provided an electromagnetic interference shield for an optical connector. The EMI shield has a socket housing with a base and a canopy. The socket housing also has a front and a rear opening. The EMI shield contains an optical transceiver that is placed near the rear opening of the socket housing and contains two components used for signal conversion from optical and electrical signals. The EMI shield further contains a rear housing that is placed near the rear opening of the socket housing for maintaining the optical transceiver in a predetermined position. The EMI shield also contains a rear shield at the rear opening of the socket housing. The EMI shield contains a front shield that includes two, independent, optical sub-housing shields.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, this invention provides an electromagnetic interference shield for an optical connector. The EMI shield has a socket housing with a base and a canopy. The EMI shield contains an optical transceiver used for signal conversion from optical and electrical signals and a rear housing for maintaining the optical transceiver in a predetermined position.

Figure 1:
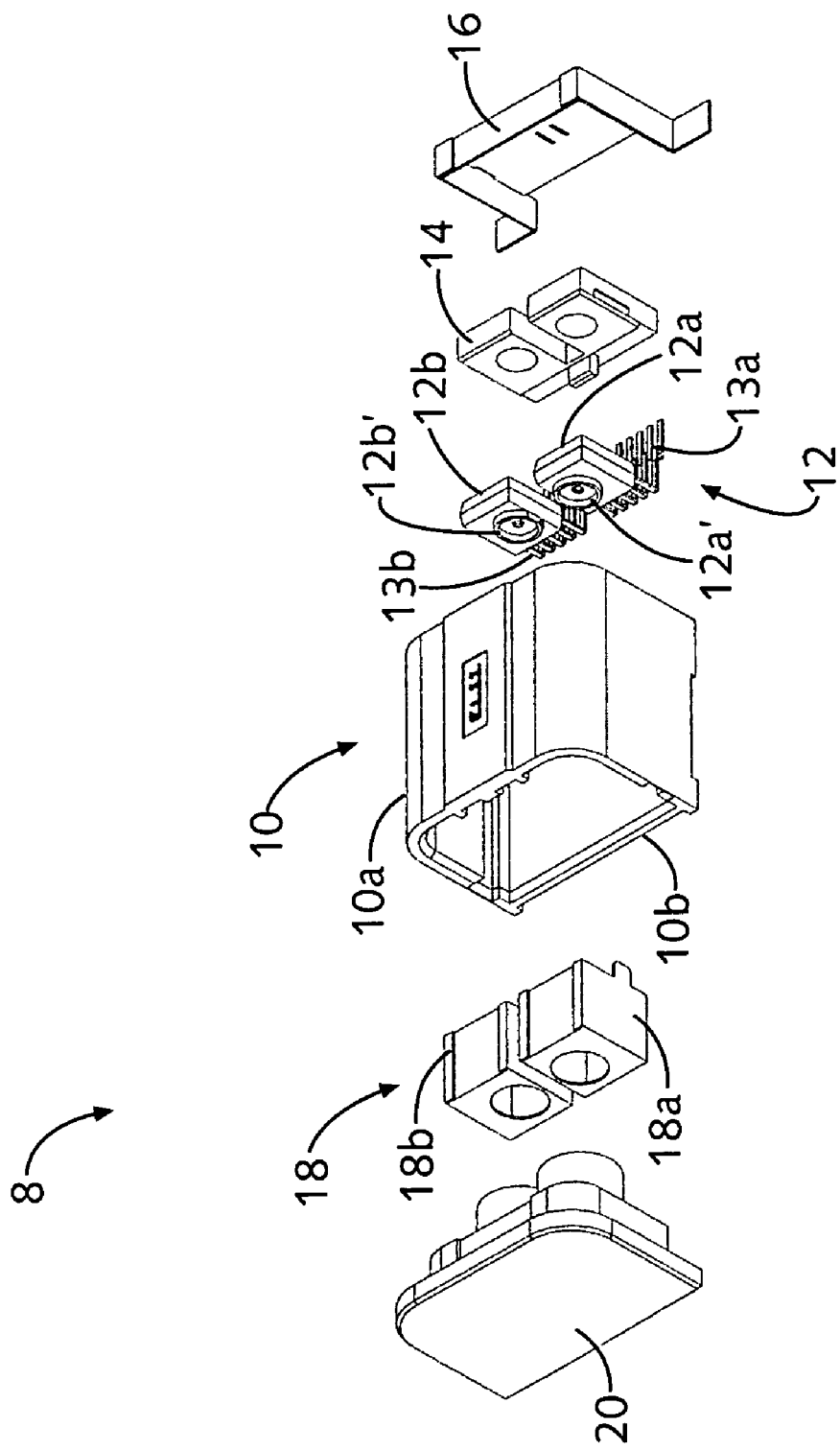
FIG. 1 is an exploded view of the EMI shield in accordance with the invention.

Referring now to FIG. 1, there is shown an exploded view of the EMI shield shown, generally at reference number 8, in accordance with the invention. A socket housing 10 is formed in the shape of a canopy 10a, a base 10b and openings at the front and rear. Although the quonset hut cross-section of canopy 10a is preferred, it should be understood that other configurations can be used, resulting in cross-sections such as squares, rectangles, trapezoids, parallelograms, polygons, circle chords, and ellipses. The canopy 10a and base 10b allow for overall EMI protection for the components of the optical connector and housing for the other components of the EMI shield 8.

Within socket housing 10 is an optical transceiver 12 that has two components: a Receive Optical SubAssembly (ROSA) 12a and a Transmit Optical SubAssembly (TOSA) 12b. ROSA 12a receives an optical signal and converts the optical signal to an electrical signal. Conversely, TOSA 12b receives an electrical signal and converts the electrical signal to an optical signal. Typical optical transceiver components are manufactured by Firecomms as Model Nos. FC300R and FC300D.

Both ROSA 12a and TOSA 12b include respective protruding rings to ensure confined light from the light source, when assembled, as described hereinbelow.

Connected to ROSA 12a and TOSA 12b are sets of electrical leads 13a and 13b, respectively. Leads 13a, 13b are bent in the preferred embodiment, as shown, but may be longitudinal and unbent, depending upon the configuration of larger structures, not shown, to which EMI shield 8 is attached.

Also disposed within socket housing 10 is a rear housing 14 used to maintain optical transceiver 12 in a predetermined position. At the rearmost portion of socket housing 10 is a rear shield 16 for protecting the optical connector from EMI. Rear shield 16 is preferably aluminum, but other metals and alloys can be used including but not limited to brass, copper, and conductive plastic.

Proximate the front of socket housing 10 is a front shield 18 which includes two, independent, optical sub-housing shields 18a and 18b. Each shield 18a and 18b is recessed to accommodate the 360° protruding rings 12a', 12b' integrated with of ROSA 12a and TOSA 12b, respectively, thereby ensuring that light is completely confined in the device 8. The independent sub-housing shields 18a, 18b provide for separate EMI protection for ROSA 12a and TOSA 12b of the optical transceiver 12. The use of sub-housing shields 18a and 18b provides additional isolation of ROSA 12a and TOSA 12b, resulting in the drastic reduction or elimination of electrical crosstalk therebetween. Moreover, the shields 18a and 18b are preferably heat-conducting, metal components, acting as heat sinks and insuring that TOSA 12a and ROSA 12b remain below the temperature of 50° C. during operation.

Adjacent front shield 18 is provided an optional dust cover 20 that is placed at the front most portion of the socket housing 10. Dust cover 20 may be a non-conductive material, such as plastic, ceramic, fiberglass, etc.

Figure 2:
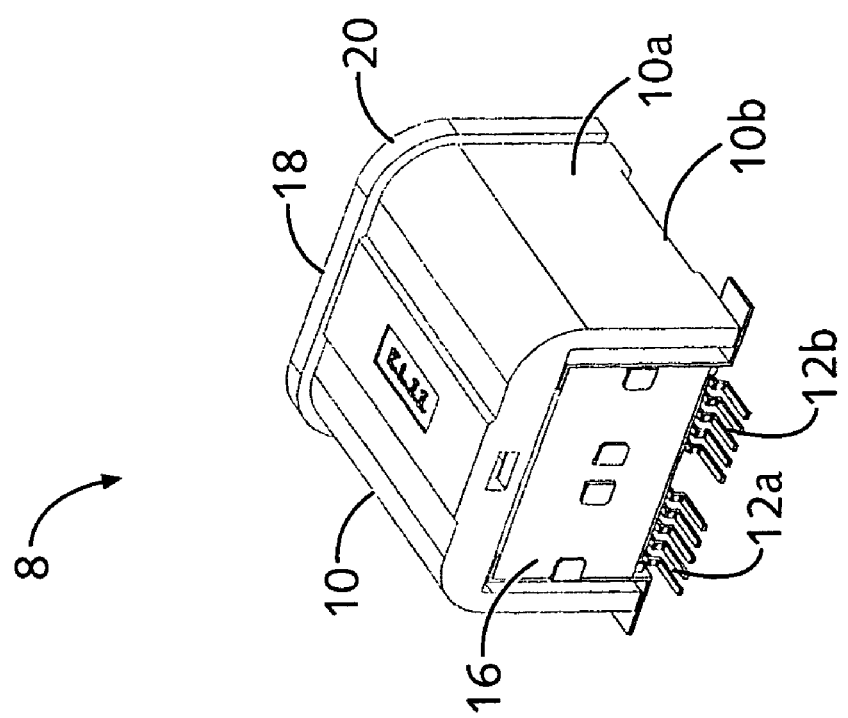
FIG. 2 is a rear perspective view of the assembled EMI shield shown in FIG. 1.

Referring now to FIG. 2, the assembled EMI shield 8 has front shield 18, optional dust cover 20, and rear shield 16 attached to socket housing 10. Sets of electrical leads 13a, 13b corresponding and electrically connected to the ROSA 12a and TOSA 12b, respectively, are bent parallel to base 10b to be flush with a supporting surface (e.g., circuit board) not shown. Depending upon the configuration of the supporting structure, however, sets of electrical leads 13a, 13b can be bent in other geometries or unbent.

Since other modifications are changes varied to fit particular operating conditions and environments or designs will be apparent to those skilled in the art, the invention is not considered limited to the examples chosen for purposes of disclosure, and covers changes and modifications which do not constitute departures from the true scope of this invention.

Having thus described the invention, what is desired to be protected by letters patents is presented in the subsequently appended claims.

What is claimed is:

1. An electromagnetic interference (EMI) shield for an optical connector, comprising:
   a) a socket housing having a base and a canopy, said housing having a front opening and a rear opening;
   b) an optical transceiver having means for alignment of optical components thereof and said socket housing, said means for alignment being disposed within and proximate said rear opening of said socket housing;
   c) a rear housing disposed proximate said rear opening of said socket housing for maintaining said optical transceiver in a predetermined position;
   d) a rear, heat sinking shield proximate said rear opening of said socket housing; and
   e) a front shield comprising two, independent, optical sub-housing shields at least a portion thereof being overlapped by said rear, heat sinking shield.

2. The EMI shield for an optical connector, as recited in claim 1, further comprising a dust cover proximate said front opening of said socket housing.

3. The EMI shield for an optical connector, as recited in claim 1, wherein said optical transceiver comprises two components used for signal conversion.

4. The EMI shield for an optical connector, as recited in claim 3, wherein said optical transceiver comprises a plurality of electrically conductive leads.

5. The EMI shield for an optical connector, as recited in claim 4, wherein said plurality of electrically conductive leads is bent.

6. The EMI shield for an optical connector, as recited in claim 1, wherein said socket housing comprises one of the group, plastic, metal, TOSA, and ROSA.

7. The EMI shield for an optical connector, as recited in claim 1, wherein said two, independent, optical sub-housing shields each comprises means for confining light transmitted therethrough.

8. An optical connector assembly, comprising:
   a) an optical transceiver having means for alignment of optical components thereof and said socket housing, and having electrically conductive leads attached thereto; and
   b) an EMI shield, comprising:
      i) a housing;
      ii) a front shield comprising two, independent, optical sub-housing shields connected to said housing; and
      iii) a rear, heat sinking shield connected to said housing and overlapping at least a portion of said front shield.

9. The optical connector assembly, as recited in claim 8, further comprising a dust cover proximate said front shield connected to housing.

10. The optical connector assembly, as recited in claim 8, wherein said optical transceiver comprises two components used for signal conversion.

11. The optical connector assembly, as recited in claim 10, wherein said optical transceiver comprises a plurality of electrically conductive leads.

12. The optical connector assembly, as recited in claim 11, wherein said plurality of electrically conductive leads is bent.

13. The optical connector assembly, as recited in claim 8, wherein said housing comprises one of the group, plastic, metal, TOSA, and ROSA.

14. The EMI shield for an optical connector, as recited in claim 8, wherein said two, independent, optical sub-housing shields each comprises means for confining light transmitted therethrough.

15. A two component optical transceiver comprising a Receive Optical SubAssembly (ROSA), having a first sub-housing EMI shield, and a Transmit Optical SubAssembly (TOSA), having a second sub-housing EMI shield.

16. The two component optical transceiver, as recited in claim 15, wherein said optical transceiver comprises a plurality of electrically conductive leads.

17. The two component optical transceiver, as recited in claim 16, wherein said plurality of electrically conductive leads is bent.

18. The two component optical transceiver, as recited in claim 16, further comprising a socket housing having a base and a canopy.

19. The two component optical transceiver, as recited in claim 17, further comprising a socket housing having a base and a canopy.

20. The two component optical transceiver, as recited in claim 15, further comprising:
   a) a rear housing disposed proximate said rear opening of said socket housing for maintaining said optical transceiver in a predetermined position; and
   b) a rear shield proximate said rear opening of said socket housing.

21. The two component optical transceiver, as recited in claim 18, further comprising:
   a) a rear housing disposed proximate said rear opening of said socket housing for maintaining said optical transceiver in a predetermined position; and
   b) a rear shield proximate said rear opening of said socket housing.

22. The EMI shield for an optical connector, as recited in claim 1, wherein said means for alignment comprises protruding, 360° rings integrated with said optical transceiver.

* * * * *